(12) United States Patent
D'Alterio et al.

(10) Patent No.: US 11,159,673 B2
(45) Date of Patent: Oct. 26, 2021

(54) REPOSITIONING OF A DISPLAY ON A TOUCH SCREEN BASED ON TOUCH SCREEN USAGE STATISTICS

(71) Applicant: INTERNATIONAL BUSINESS MACHINES CORPORATION, Armonk, NY (US)

(72) Inventors: Domenico D'Alterio, Rome (IT); Giuseppe Longobardi, Naples (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 15/908,912

(22) Filed: Mar. 1, 2018

(65) Prior Publication Data
US 2019/0273819 A1 Sep. 5, 2019

(51) Int. Cl.
*H04M 1/72472* (2021.01)
*G06F 21/82* (2013.01)
(Continued)

(52) U.S. Cl.
CPC ...... *H04M 1/72472* (2021.01); *G06F 3/0481* (2013.01); *G06F 3/0488* (2013.01); *G06F 9/451* (2018.02); *G06F 21/82* (2013.01)

(58) Field of Classification Search
CPC ......... H04M 1/72586; H04M 1/72448; H04M 1/724; H04M 2250/22; H04M 1/72472;
(Continued)

(56) References Cited

U.S. PATENT DOCUMENTS 8,869,261 B1 * 10/2014 Carter ............... G06F 21/36
455/410
9,244,583 B2 1/2016 Lovitt
(Continued)

FOREIGN PATENT DOCUMENTS

CN 104620215 A 5/2015
CN 106201324 A 12/2016

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.
(Continued)

*Primary Examiner* — John T Repsher, III
(74) *Attorney, Agent, or Firm* — Noah Sharkan, Esq.; Kevin P. Radigan, Esq.; Heslin Rothenberg Farley & Mesiti P.C.

(57) ABSTRACT

Repositioning of a display on a touch screen based on touch screen usage statistics. Usage information of the touch screen is obtained, based on using the touch screen, which includes a plurality of contact points. Based on the usage information, positioning information for a display to be depicted on the touch screen is determined. The display is to be used to enter data and includes multiple contact points. Based on the positioning information, the display is repositioned on the touch screen. The repositioning includes moving one or more contact points of the multiple contact points from one or more locations on the touch screen to one or more other locations on the touch screen.

15 Claims, 11 Drawing Sheets

(51) Int. Cl.
*G06F 3/0481* (2013.01)
*G06F 9/451* (2018.01)
*G06F 3/0488* (2013.01)
*H04M 1/72448* (2021.01)
*H04M 1/724* (2021.01)

(58) Field of Classification Search
CPC ...... G06F 3/0488; G06F 3/0481; G06F 9/451; G06F 21/82
See application file for complete search history.

(56) References Cited

U.S. PATENT DOCUMENTS

| | | | |
|---|---|---|---|
| 2007/0188473 A1 | 8/2007 | Anwar | |
| 2008/0231604 A1* | 9/2008 | Peterson | G06F 3/04886 345/173 |
| 2009/0189864 A1* | 7/2009 | Walker | G06F 3/0219 345/169 |
| 2009/0265644 A1* | 10/2009 | Tweed | G06F 3/04886 715/762 |
| 2010/0245384 A1* | 9/2010 | Mase | G06F 3/0418 345/618 |
| 2012/0284297 A1* | 11/2012 | Aguera-Arcas | G06F 3/03547 707/769 |
| 2013/0021287 A1* | 1/2013 | Endo | G06F 3/04886 345/173 |
| 2013/0024815 A1* | 1/2013 | O | H04M 1/72586 715/811 |
| 2013/0027433 A1 | 1/2013 | Hand | |
| 2013/0120464 A1* | 5/2013 | Wei | G06F 3/04842 345/672 |
| 2014/0152583 A1* | 6/2014 | Bastide | G06F 3/0488 345/173 |
| 2015/0277571 A1 | 10/2015 | Landau | |
| 2015/0378502 A1 | 12/2015 | Hu | |
| 2017/0052702 A1* | 2/2017 | Norris, III | G06F 3/04886 |

OTHER PUBLICATIONS

Shahzad, Muhammad et al., "Secure Unlocking of Mobile Touch Screen Devices by Simple Gestures—You Can See It but You Can Not Do It," MobiCom '13, Sep. 2013, pp. 39-50.

Smith, Brian et al., "Optimizing Touchscreen Keyboards for Gesture Typing," CHI 2015, Apr. 2015, pp. 3365-3374.

* cited by examiner

|        | Column1 | Column2 | Column3 | ... | ... | ... | ColumnM | ... | ... | ,,, |
|--------|---------|---------|---------|-----|-----|-----|---------|-----|-----|-----|
| Row1   | UC 1,1  | UC 1,2  | UC 1,3  |     |     |     |         |     |     |     |
| Row2   | UC 2,1  | UC 2,2  | UC 2,3  |     |     |     |         |     |     |     |
| Row3   | UC 3,1  | UC 3,2  | UC 3,3  |     |     |     |         |     |     |     |
|        | ...     |         |         |     |     |     |         |     |     |     |
|        | ...     |         |         |     |     |     |         |     |     |     |
|        | ...     |         |         |     |     |     |         |     |     |     |
| RowN   |         |         |         |     |     |     | UC n,m  |     |     |     |
|        | ...     |         |         |     |     |     |         |     |     |     |
|        | ...     |         |         |     |     |     |         |     |     |     |
|        | ...     |         |         |     |     |     |         |     |     |     |

FIG. 2A

|       | Column1 |     |     |     |     |     |     |     | Column n |
|-------|---------|-----|-----|-----|-----|-----|-----|-----|----------|
| Row 1 | 2000    | 15  | 0   | 0   | 0   | 0   | 0   | 0   | ...      |
|       | 15      | 0   | 20  | 40  | 40  | 20  | 10  | 0   | ...      |
|       | 0       | 0   | 0   | 0   | 0   | 0   | 0   | 0   | ...      |
|       | 0       | 10  | 15  | 16  | 15  | 10  | 5   | 0   |          |
|       | 0       | 10  | 25  | 25  | 15  | 100 | 0   | 0   |          |
|       | 0       | 0   | 0   | 0   | 0   | 10  | 0   | 0   |          |
|       | 0       | 140 | 200 | 200 | 120 | 10  | 10  | 0   |          |
|       | 0       | 50  | 60  | 500 | 430 | 100 | 0   | 0   |          |
|       | 0       | 100 | 650 | 1000| 855 | 205 | ... | ... | ...      |
| Row n | ...     | ... | ... | ... | ... | ... | ... | ... |          |

FIG. 2B

OBTAIN, BASED ON USING A TOUCH SCREEN OF A DEVICE, USAGE INFORMATION OF THE TOUCH SCREEN ~800

THE TOUCH SCREEN INCLUDING A PLURALITY OF CONTACT POINTS ~802

DETERMINE, BASED ON THE USAGE INFORMATION, POSITIONING INFORMATION FOR A DISPLAY TO BE DEPICTED ON THE TOUCH SCREEN ~804

THE DISPLAY IS TO BE USED TO ENTER DATA AND INCLUDES MULTIPLE CONTACT POINTS OF THE PLURALITY OF CONTACT POINTS ~806

REPOSITION, BASED ON THE POSITIONING INFORMATION, THE DISPLAY ON THE TOUCH SCREEN ~808

THE REPOSITIONING INCLUDING MOVING ONE OR MORE CONTACT POINTS OF THE MULTIPLE CONTACT POINTS FROM ONE OR MORE LOCATIONS ON THE TOUCH SCREEN TO ONE OR MORE OTHER LOCATIONS ON THE TOUCH SCREEN ~810

ALTER THE DISPLAY ~812

CHANGE A SIZE OF THE DISPLAY ~814

CHANGE AN ORIENTATION OF THE DISPLAY ~816

PROVIDE A USER AN INDICATION OF THE ORIENTATION OF THE DISPLAY ~818

FIG. 8A

REPOSITIONING OF A DISPLAY ON A TOUCH SCREEN BASED ON TOUCH SCREEN USAGE STATISTICS

BACKGROUND

One or more aspects relate, in general, to devices having touch screens, and in particular, to utilization of the touch screens.

Touch screens are widely used as input mechanisms for devices that are used daily, such as ATMs (Automated Teller Machines), satellite navigators, videogames, smartphones, etc. The touch surface (especially if resistive and not capacitive) can reduce its sensibility and reactivity with use and time, due to e.g., surface deterioration. There are cases in which the same path and the same surface portion are hit repeatedly. This is the case, for example, when a password to unlock, e.g., a smartphone, is set to be a sequence entered on the touch screen.

This has a couple of side effects. First, the same part of the surface is repeatedly contacted. For instance, if a smartphone is unlocked, as an example, 30 times a day (e.g., for access: calls, messages, chats, applications, calendar, email, pictures, verify signal strength, battery status, etc.), in one year, the same part of the screen is used 30*365=10950 times, just for unlocking. Secondly, when the screen is contacted, a track is left, more or less visible. It is marked, especially if starting from a clean screen. Or, it might simply be discovered by looking at the input movement. This might lead to a security exposure. The device can be easily unlocked by following the same path.

Moreover, consider that normally the screen is locked after a reduced amount of time in order to reduce the battery consumption. Thus, for long lasting tasks (for example, writing an email and swapping out to read some data to insert from a document), the screen locking is triggered multiple times, and therefore, it is to be unlocked multiple times, until the task is finished. This increases the usage and deterioration of the screen surface, making it even worse than the above calculated number of unlocks.

Further, for the life of the touch screen surface, there are areas which are hardly ever used, and are practically brand new, even at the end of the life of a device.

SUMMARY

Based on the foregoing, one or more aspects are provided to improve technology, including the technical field of touch screen devices. As an example, one or more aspects are provided to improve and/or optimize the use of the available surface of a touch screen of a touch screen device.

Shortcomings of the prior art are overcome and additional advantages are provided through the provision of a computer program product for facilitating usage of a touch screen of a device. The computer program product comprises a storage medium readable by a processing circuit and storing instructions for performing a method. The method includes, for instance, obtaining, based on using a touch screen of a device, usage information of the touch screen, which includes a plurality of contact points. Based on the usage information, positioning information for a display to be depicted on the touch screen is determined. The display is to be used to enter data and includes multiple contact points of the plurality of contact points. Based on the positioning information, the display is repositioned on the touch screen. The repositioning includes moving one or more contact points of the multiple contact points from one or more locations on the touch screen to one or more other locations on the touch screen.

By repositioning the display, use of the touch screen is optimized. The repositioning enables more areas of the touch screen to be used, and may increase security by making it more difficult to, e.g., determine the input data, such as a password.

In one aspect, the display is also altered. The altering the display includes, for instance, changing a size of the display, and/or changing an orientation of the display. In a further aspect, a user is provided an indication of the orientation of the display. By altering the display, additional benefits are realized, including but not limited to, optimization of usage of the screen and/or improved security by making it even more difficult to determine the input data, such as a password.

As one example, the obtaining usage information includes monitoring activation by a user of at least a subset of the plurality of contact points, and obtaining one or more counts of activation of one or more contact points of the at least the subset of the plurality of contact points. The usage information includes the one or more counts. In one embodiment, the positioning information is based on the one or more counts. By using the counts, areas of the touch screen surface less utilized may be used, improving the wear of the touch screen surface.

As an example, the repositioning includes moving at least one contact point of the one or more contact points to at least one location on the touch screen with less usage relative to other locations on the touch screen. Again, this is to improve usage of the touch screen and/or improve security.

In one embodiment, at least one of the determining and the repositioning is performed periodically based on statistics obtained from the usage information.

As a particular example, the data to be entered includes a password to unlock the touch screen.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 2A-2B depict examples of statistics collected on the usage of a touch screen of a device, in accordance with an aspect of the present invention;

FIGS. 8A-8B depict one example of an aspect of facilitating usage of a touch screen of a device, in accordance with an aspect of the present invention;

DETAILED DESCRIPTION

In accordance with one or more aspects, a capability is provided to improve technology, including a technical field of touch screen devices. As an example, a capability is provided to optimize usage of a touch screen of a device having such a touch screen. In one aspect, analytics data on usage of contact points on the touch screen (also referred to as the touch surface pixel area usage) is gathered and used to determine whether unlock points (or application requested input graphical data) are to be displayed in a different location (e.g., a less utilized area) of the screen, in order to allow, e.g., a more uniform average use and deterioration of the touch surface portions.

Figure 1A:
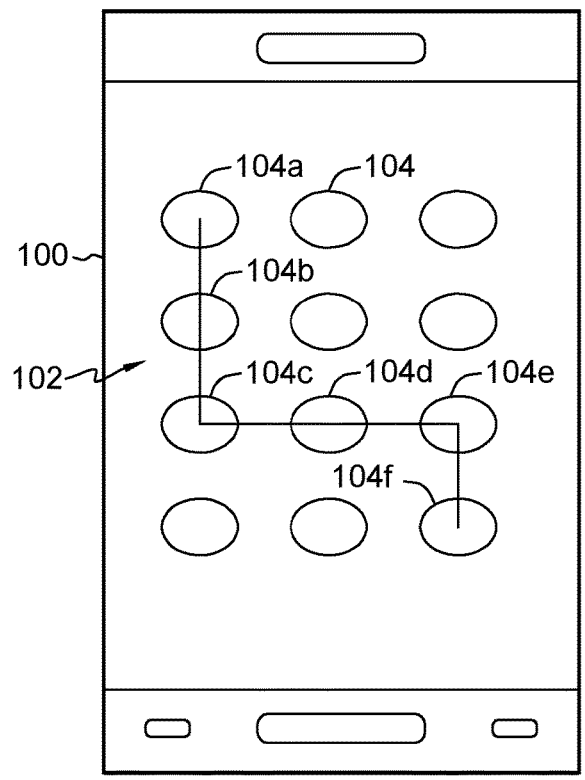
FIGS. 1A-1B depict examples of displays on a touch screen of a device, in accordance with an aspect of the present invention.

One example of a touch screen is depicted in FIG. 1A. As shown, a screen 100 includes a display 102 of multiple contact points 104 (represented in this figure as ovals, but could be circles, dots, or any other representation), which may be used to input a graphical user password (e.g., a pattern or sequence) or other graphical data. In this example, a password is entered using contact points 104a-104f. Other contact points of the display are not used in this particular example, but may be used in other examples. Further, the touch screen may include other contact points not shown here.

Figure 1B:
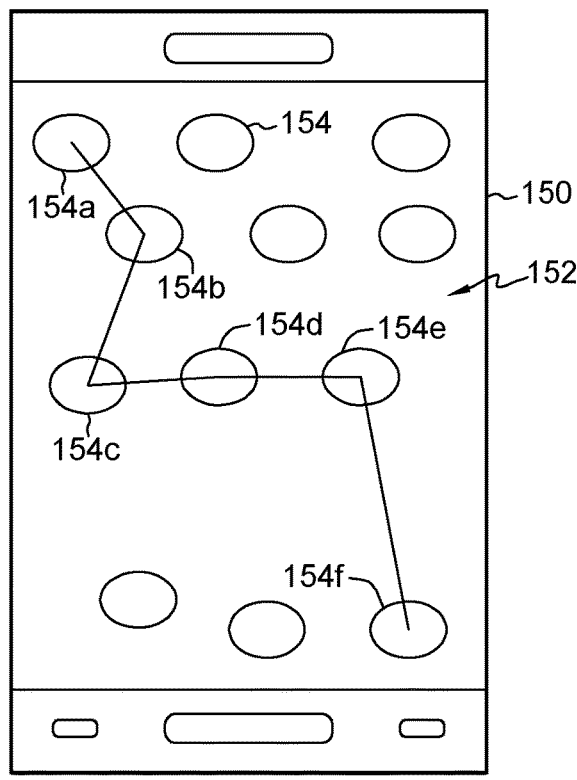

In accordance with an aspect of the present invention, it may be decided to change the display such that the contact points are shown in other areas of the screen, in order to minimize usage of one particular area of the screen. For instance, in FIG. 1B, screen 150 includes display 152, which includes multiple contact points 154, but the contact points are displayed differently than in FIG. 1A. In this example, the password is entered using contact points 154a-154f. One or more of contact points 154a-154f may be in different locations on the screen than one or more of contact points 104a-104f.

By choosing different locations on the screen in which to provide a display used to input data (e.g., password sequence, etc.), usage of the screen is optimized. Moreover, it may be more difficult to discover the input data, such as the unlock sequence, by looking at the screen or following movement of the object (e.g., finger or other object) entering the data, since the positioning of the requested contact points may change at selected times (e.g., every time, every n times, etc.). This avoids having contact points on the surface that are never used, and others that are over-used. This may also be applied to different application interfaces and not only to unlock interfaces (for example, to a phone keyboard or to an input qwerty-keyboard shown on the screen, etc.). Usability aspects may be taken into consideration, and may be user selectable.

The decision to reposition a display is based, for instance, on usage of the contact points of the display and/or other contact points of the screen. A determination of usage or activation of a contact point depends, e.g., on the type of touch screen.

There are different types of touch screen surfaces. Each may be built differently and/or work in a different manner, but each is able to detect the position (coordinates) where an object (e.g., a finger, a pointer, a pen, a pencil, a stylus, a gloved hand, etc.) contacts the surface. Examples of different types of touch screen surfaces are described below.

One example of a touch screen that may be included in a device, such as a smartphone or other type of touch screen device, is a resistive film touch screen. In one example, a resistive film touch screen includes a film screen to be contacted by an object. The film screen has a transparent electrode film covering at least the underside of the film screen. Further, the touch screen includes a glass panel covered at least on the top with a transparent electrode film. The film screen and glass panel are coupled to one another via an insulator layer on, for instance, each end and have a narrow gap between them. Within the narrow gap are one or more spacer dots.

With such a screen, a contact point or position on the screen contacted by an object is detected using changes in pressure. Pressing the surface of the screen (e.g., the screen film) presses the electrodes in the film, and the transparent electrode films come in contact resulting in the flow of electrical current. The point of contact is identified by detecting the change in voltage.

Another example of a touch screen is a surface capacitive touch screen, which includes a glass panel having a transparent electrode film placed on top thereof. Further, a protective cover covers at least the transparent electrode film. When pressure is applied, electric voltage is applied to electrodes positioned in the four corners of the glass substrate panel, generating a uniform low-voltage electrical field across the entire screen. The coordinates of the position at which the object touches the screen are identified by measuring the resulting changes in electrostatic capacity at the four corners of the screen.

A further example of a touch screen is a projected capacitive touch screen. The internal structure of such a touch screen includes a substrate incorporating an integrated circuit chip for processing computations, over which a layer of numerous transparent electrodes is positioned in specific patterns. The surface is covered with an insulating glass or plastic cover. When an object approaches the surface, an electrostatic capacity among multiple electrodes changes simultaneously, and the position where contact occurs can be identified precisely by measuring the ratios between the electrical currents.

Other types of touch screens are also possible and may be used with one or more aspects of the present invention.

In each type of touch screen, the coordinates of the contact points may be detected. That is, the coordinates of the pixels on the screen that have been activated are detected. As used herein, activation refers to a touch of the touch screen, a depression of the touch screen or any other action that indicates an input of information on the touch screen. In accordance with an aspect of the present invention, usage data is gathered regarding the contact points, and this data is used to opportunely drive the positioning of a display on the screen used for inputting information, such as a password pattern, another pattern, a sequence, and/or other information.

As an example, each activation of a contact point is counted and maintained in a data structure, such as a table. Many examples of tables and/or other data structures may be used to hold this information.

For instance, referring to FIG. 2A, a table 200 may include a plurality of rows 202 and a plurality of columns 204. Each row, column intersection includes a usage counter (UC) 206 of a contact point on the screen. For instance, UC x,y=Usage Counter of a pixel in row x, column y. In another example, the data structure only maintains data on the contact points that are activated. With each activation in a position h,k (row h and column k), the corresponding usage counter is updated, e.g., UC h,k=(UC h,k)+1.

Another depiction of a table is shown in FIG. 2B. In this example, specific usage counts 220 for contact points during a specific time period are displayed in a table 250. For instance, contact point 1,1 has been used 2000 times during the time period, while contact point 3,2 has been used 0 times during that time period, etc.

An activation may include an area that may include more than one pixel. In such an example, each activation updates the usage count for each activated pixel.

In yet other examples, the coordinates of active contact points on the screen are maintained in a data structure, such as a table; and/or the count of each activation of an active contact point. In still other examples, there may be multiple data structures. For instance, one structure may maintain the coordinates of the contact points that are activated, and another structure may include a count of the activations for each contact point. Many examples are possible.

An evaluation of the average activations along a specific row of the surface may be performed (e.g., the delta for a new session, and/or cumulative for the life of the device up to now). The rows having the lowest hit rate, and the columns having the lowest hit rate are determined and may be selected to be used to show the positions to be used to enter data (e.g., password and/or other data).

In embodiments, the statistics may be granular (pixel or pixels related to a single contact point) or less granular (area related: that is involving pixels for multiple contact points). For instance, an area usage count may be determined, as described with reference to FIG. 3.

Figure 3:
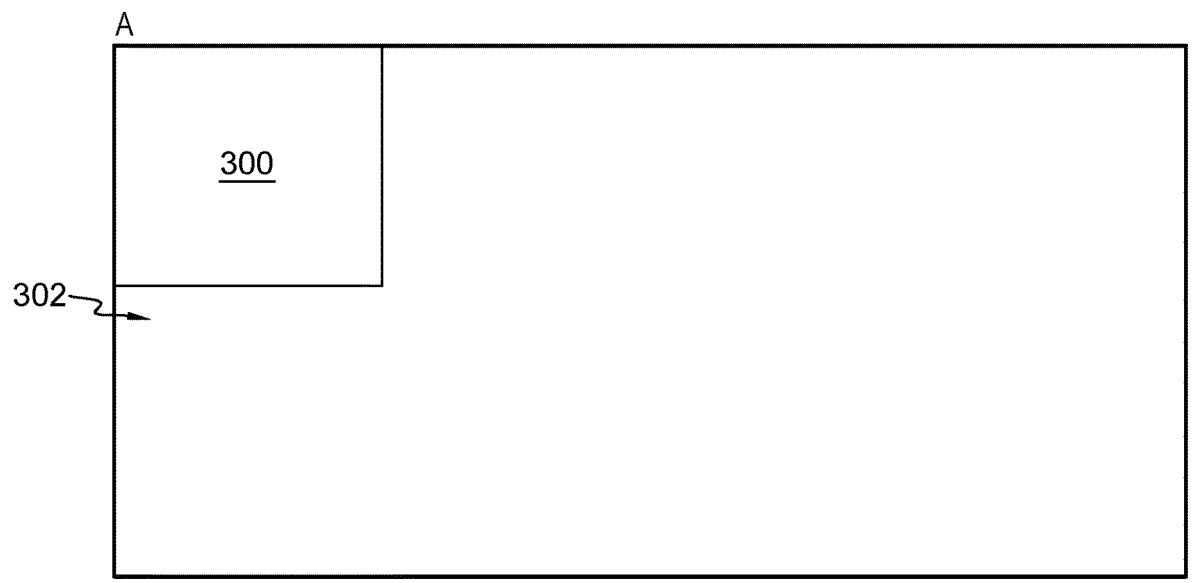
FIG. 3 depicts one example of a display area on a touch screen in which an area usage count may be obtained, in accordance with an aspect of the present invention.

As depicted in FIG. 3, an area 300 may be displayed on a screen 302, and that area may be used to enter information, such as an unlock password. Assume, in one example, that area 300 has a size of 10×10 pixels, and that in this example, the display is placed starting at row 1, column 1 of screen 302, referred to herein as Corner A. The Area Usage Count (AUC) may be evaluated as: AUC (1,10)=SUM UC (i,j) for i=1 to 10, and j=1 to 10.

More generally, if the area is placed to start in position x,y, the Area Usage Count is:

AUC (x,y)=SUM UC(i,j) for i=x to x+10 and j=y to y+10.
Yet further, for a generic area size S1×S2:
AUC (x,y)=SUM UC(i,j) for i=x to x+S1 and j=y to y+S2.
At the end of the calculations, the technique may evaluate the coordinates x,y corresponding to Min (AUC(x,y)) value.

There may be different possible values for sizes among which to select Sw×Sz. The usage statistics may be evaluated for each area, according to the settings.

In a further embodiment, the evaluation may also consider just part of the area which will be involved in the patterns drawn on the screen surface. Other variations are also possible.

The statistics may be evaluated in the background. As examples, they may be evaluated periodically, based on usage count percentage variation; based on need; when an unlock action is requested; based on other actions; at a user-defined time; periodically as defined; after every activation of any contact point or a select contact point; after every x activations of any contact point or a select contact point; as explicitly indicated at a particular time; etc.; and/or a combination of one or more of the above.

Figure 4A:
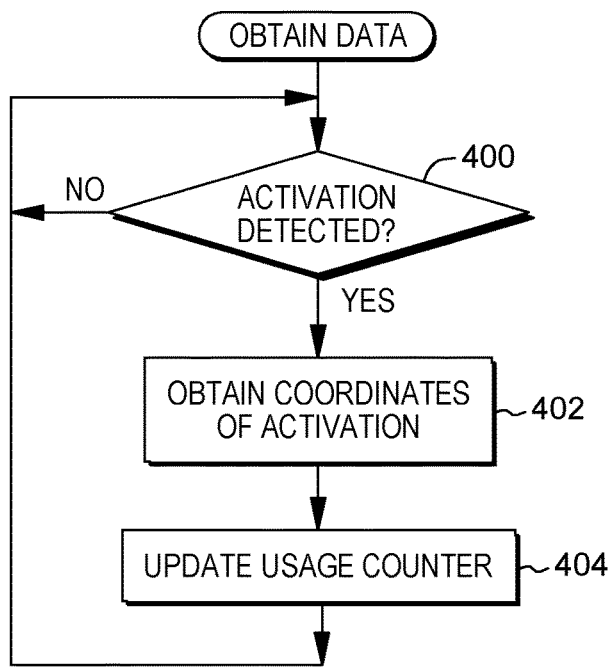
FIG. 4A depicts one example of logic used to obtain usage information to be used in repositioning a display on a touch screen of a device, in accordance with an aspect of the present invention.
Figure 4B:
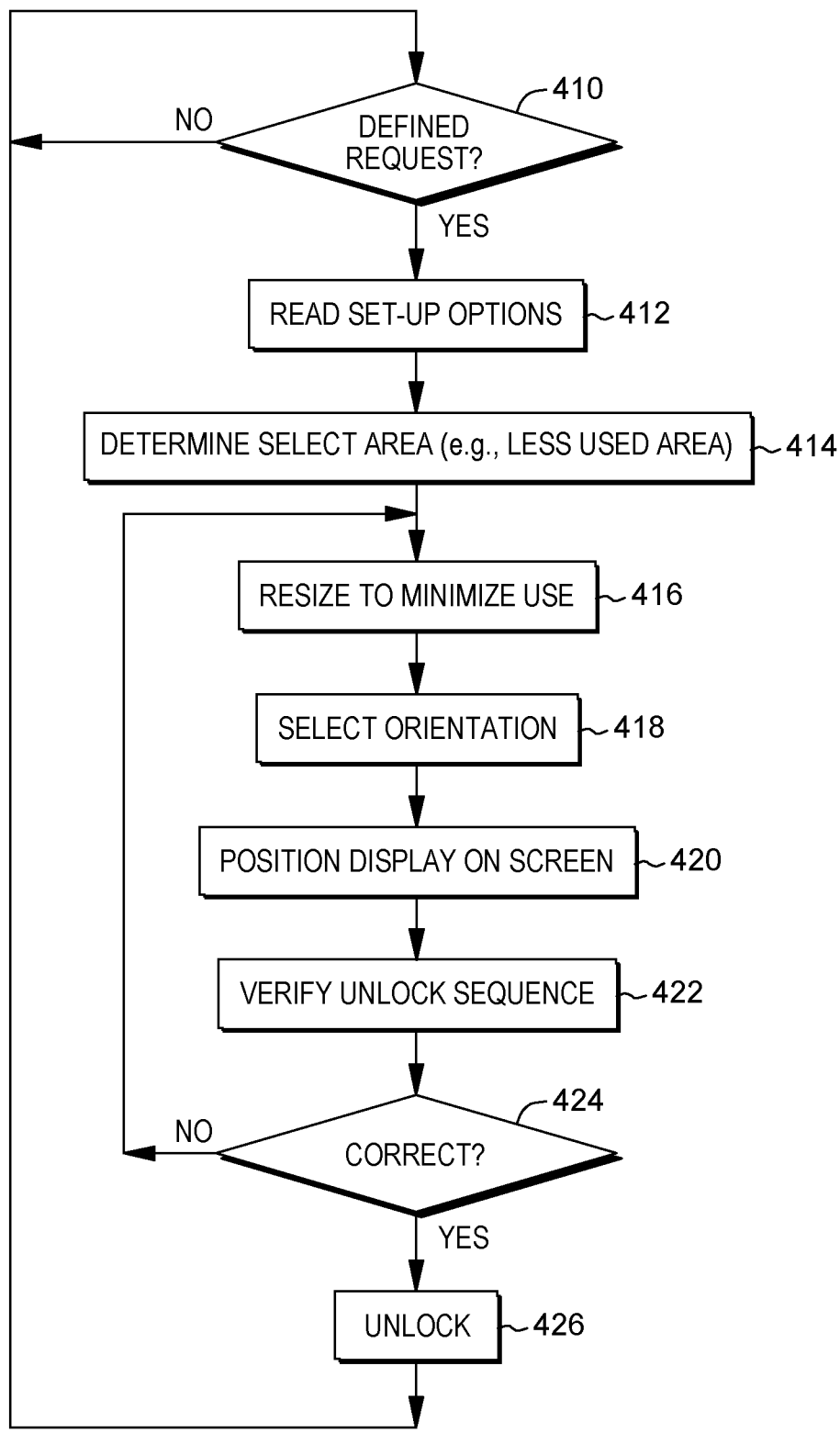
FIG. 4B depicts one example of logic to position or reposition a display on a touch screen, in accordance with an aspect of the present invention.

Further details regarding obtaining usage information and using that information to determine where to place a display (in particular, contact points of the display) on a screen to be used to input information are described with reference to FIGS. 4A-4B. In particular, FIG. 4A depicts one example of obtaining touch screen data, and FIG. 4B depicts one example of depicting the display on a screen, in accordance with one or more aspects of the present invention. As an example, one or more processors executing on the device in which the screen is attached processes the logic of FIG. 4A and/or FIG. 4B. In another example, one or more processors coupled to the device execute the logic of FIG. 4A and/or FIG. 4B. Further, a combination of processors executing on and coupled to the device may be used. Many possibilities exist.

Referring to FIG. 4A, a determination is made as to whether activation has been detected, INQUIRY 400. That is, has an object contacted a contact point of the screen (e.g., depressed the contact point)? This is determined as described above, and depends on the type of touch screen. If an activation has not been detected, then processing continues with INQUIRY 400. However, if an activation has been detected, then coordinates of the activation are obtained, STEP 402. For instance, one or more coordinates of the one or more pixels corresponding to the activation are determined. Then, for one or more of the coordinates, one or more usage counters are updated (e.g., incremented by one), STEP 404. Processing continues with INQUIRY 400.

In one example, this logic continuously updates the usage counts. In other examples, the usage counts are updated periodically (e.g., every n seconds or other time; based on a selected criterion; etc.). Further, the counts may be re-initialized (e.g., to zero) after a certain event, or after a certain amount of time. Many possibilities exist. This usage information may then be used to determine positioning of a display on the screen, as described, in one example, with reference to FIG. 4B.

Referring to FIG. 4B, in one example, a determination is made as to whether a defined request, such as an unlock request or another specified request, has been obtained, INQUIRY 410. If a defined request (specified, e.g., via a swipe or a tap of the touch screen (e.g., on a smartphone or other device) or via another mechanism) has not been obtained, then processing continues with INQUIRY 410. Otherwise, in one embodiment, processing continues with reading set-up options, STEP 412. These set-up options may include, for instance, a desired (as specified by a user or other entity) orientation of the display; a desired (as specified by a user or other entity) size of the display; and/or other options.

Further, a determination is made of a select area (e.g., less used area) on the screen to provide the display, STEP 414. This is determined via the gathered usage data. In one example, the counts are compared to determine a less used area. In other examples, the average use of a contact point or area of contact points may be used to determine a less used area. As one particular example, the gathered usage data (e.g., counts, and/or statistics relating to the counts, such as average use) is used to determine positioning information, such as coordinates of contact points on the screen to be used for the display.

Further, other criteria (other than usage) may be used to determine the select area. Moreover, optionally, the display may be resized (e.g., selecting from a plurality of sizes) to, e.g., minimize use, based, e.g., on the set-up options, STEP 416. Further, optionally, an orientation is selected, e.g., based on the set-up options, STEP 418. By changing the orientation (e.g., rotating the display, e.g., 45°, 90°, 180°, 270°, etc.), it may be more difficult for a person other than the user entering the data to identify the input data (e.g., password); the tracks left on the screen by the object entering the data may not be helpful in identifying the input data; the screen may be more protected, avoiding using the same touch screen area/places to unlock; and an additional level of security may be added by making the unlock area rotated (and possibly reduced).

Thereafter, one or more of the determination of the select area, the positioning information, the size and the orientation are used to position the display on the screen. The positioning may be a re-positioning of the display, in which one or more contact points of the display are moved from one or more locations on the screen to one or more other locations on the screen.

The display is positioned on the screen, STEP 420, and data may be entered on the display. In one particular example, the data is an unlock sequence. Thus, in this particular example, the unlock sequence is entered and verified, STEP 422. If there is an error, INQUIRY 424, processing continues with INQUIRY 416. (In other examples, processing may continue to another step, such as STEP 420, or another step. Many possibilities exist.) Otherwise, the password is accepted and the device is unlocked, STEP 426. Processing continues to STEP 410.

In one or more embodiments, each of the determining where to position the contact points of the display, the size of the display and the orientation of the display may be performed randomly, at each defined request, or at selected times, etc. Each of the determining, the sizing, and the orientation may be performed individually or in combination with one or more of the other options.

Figures 5A, 5B, 5C, 5D:
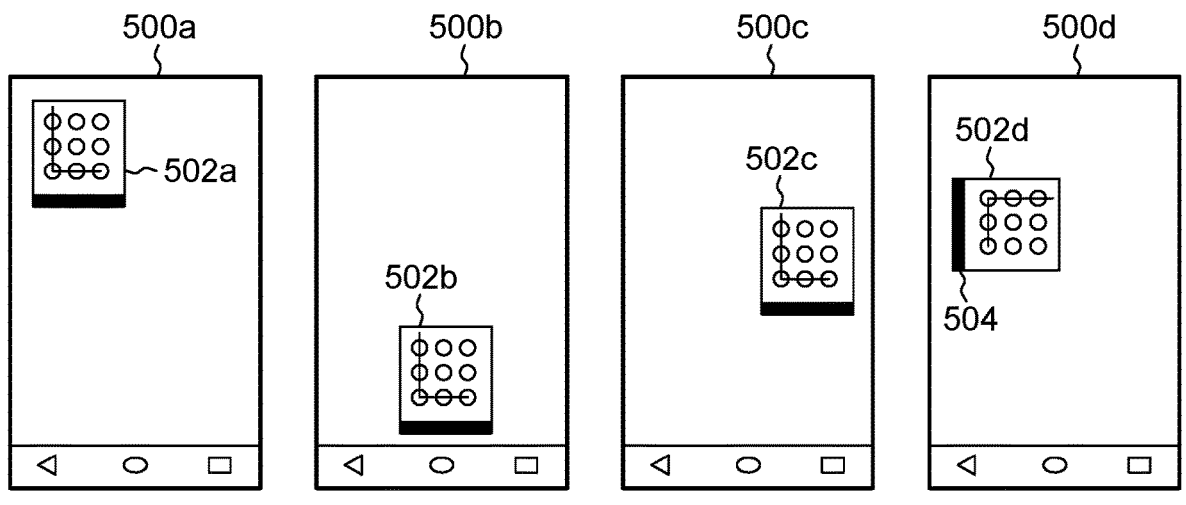
FIGS. 5A-5D depict various examples of repositioning a display on a touch screen, in accordance with an aspect of the present invention.

Examples of different positioning of displays are depicted in FIGS. 5A-5D. As shown, each screen 500a-500d includes a display 502a-502d at a different location on the screen. Further, the display of FIG. 5d is oriented differently than the other displays, as indicated by indicia 504. That is, indicia 504 indicates to the user the orientation of the display. Other indicia or indications may be used. Many possibilities exist.

Figure 6:
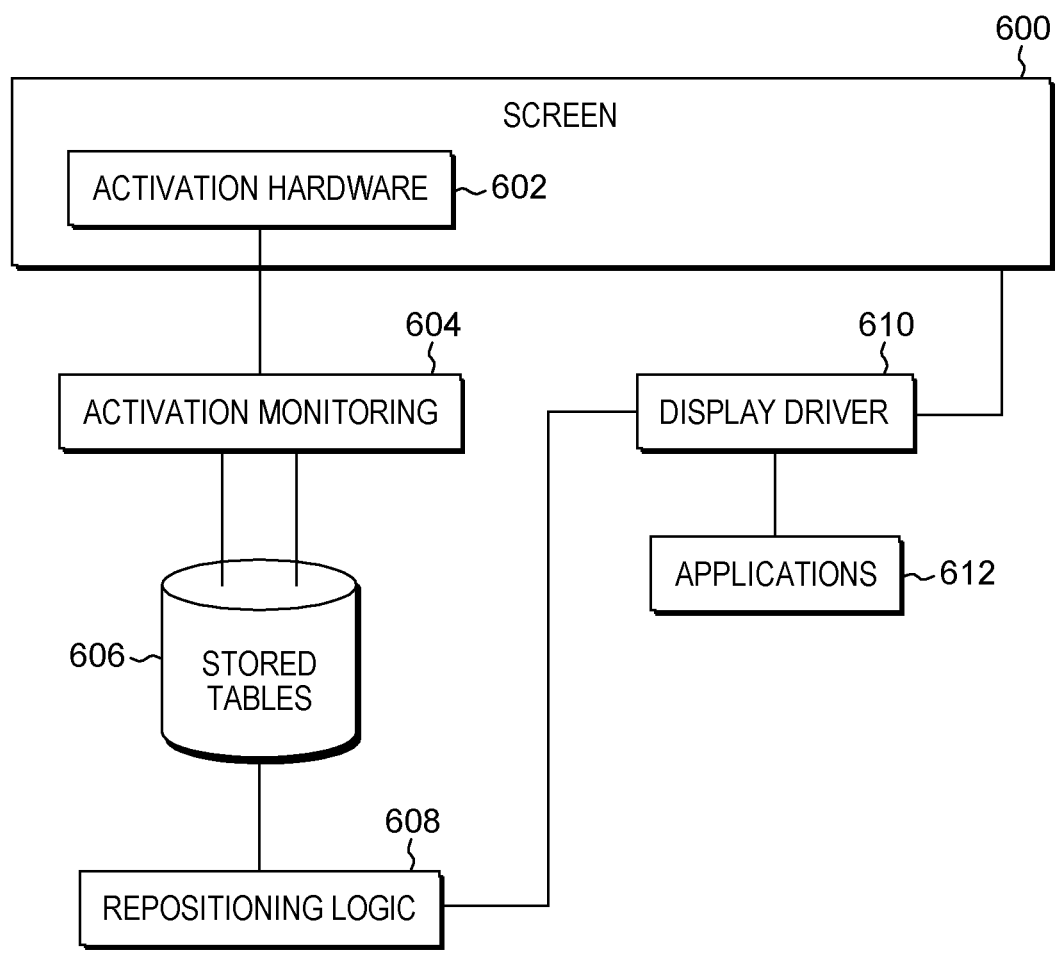
FIG. 6 depicts one example of system components that may be used to reposition a display on a touch screen, in accordance with an aspect of the present invention.

One example of a system to execute the logic of FIGS. 4A-4B is depicted in FIG. 6. A screen 600 includes or is coupled to activation hardware 602 that determines that an object has activated one or more contact points of screen 600. Activation hardware 602 is coupled to an activation monitoring component 604 that includes the logic of FIG. 4A. Activation monitoring component 604 updates data related to the activation, such as usage counters located in one or more stored tables 606. These tables may be stored in memory or other storage of the device. Stored tables 606 are accessed by repositioning logic component 608 that includes, for instance, the logic of FIG. 4B, and determines where to display the contact points to be used. The output of the repositioning logic may be used by a display driver 610 to provide the contact points on screen 600. This same driver may be used by one or more applications 612, such as applications managing passwords, etc. In a further example, the output of the repositioning logic may be input to an application, such as a password application, to provide the positions on the display. Other examples are also possible.

One or more components of FIG. 6, such as activation monitoring 604, repositioning logic 608, display driver 610 and/or applications 612 may be executed on one or more processors coupled to screen 600. These processors may be embedded in the device that includes the screen, and/or coupled to the device.

One example of a computer system that includes processors that may be used by one or more aspects of the present invention is described with reference to FIG. 7. In this example, the computer system is part of a computing environment including additional components that may or may not be used by aspects of the present invention, depending, e.g., on the device or other criteria.

Figure 7:
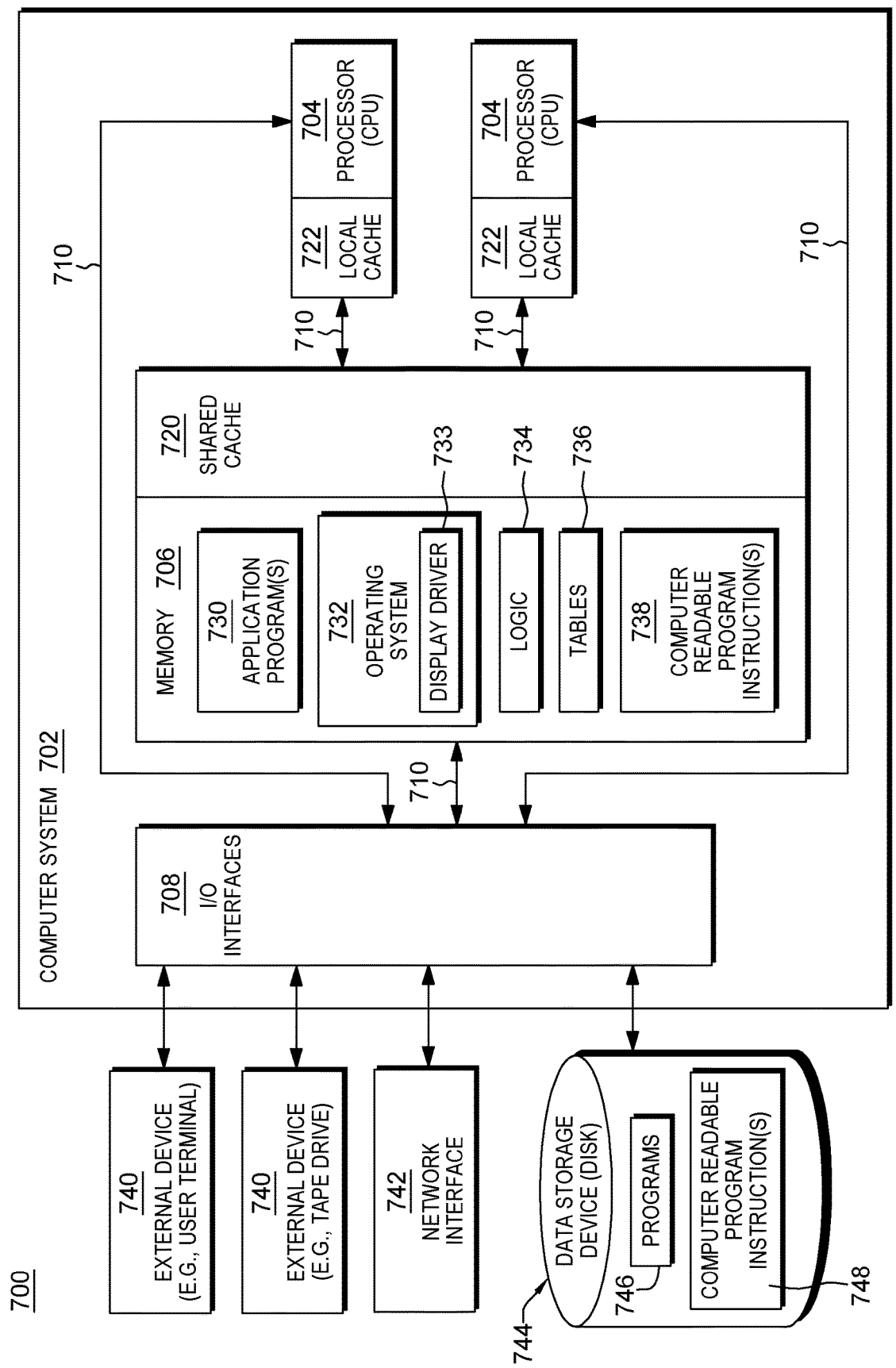
FIG. 7 depicts one example of a computing environment to incorporate and use one or more aspects of the present invention.

As shown in FIG. 7, a computing environment 700 includes, for instance, a computer system 702 shown, e.g., in the form of a general-purpose computing device. Computer system 702 may include, but is not limited to, one or more processors or processing units 704 (e.g., central processing units (CPUs)) used to execute one or more aspects of the present invention (e.g., activation monitoring 604, repositioning logic 608), a memory 106 (a.k.a., system memory, main memory, main storage, central storage or storage, as examples), and one or more input/output (I/O) interfaces 708, coupled to one another via one or more buses and/or other connections 710.

Bus 710 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 706 may include, for instance, a cache 720, such as a shared cache, which may be coupled to local caches 722 of processors 704. Further, memory 706 may include one or more programs or applications 730; an operating system 732 including a display driver 733 (e.g., display driver 610); logic 734, including, but not limited to, activation monitoring 604 and repositioning logic 608; tables 736 (e.g., stored tables 606); and one or more computer readable program instructions 738. Computer readable program instructions 738 may be configured to carry out functions of embodiments of aspects of the invention.

Computer system 702 may also communicate via, e.g., I/O interfaces 708 with one or more external devices 740, one or more network interfaces 742, and/or one or more data storage devices 744. Example external devices include a user terminal, a tape drive, a pointing device, a display, etc. Network interface 742 enables computer system 702 to communicate with one or more networks, such as a local area network (LAN), a general wide area network (WAN), and/or a public network (e.g., the Internet), providing communication with other computing devices or systems.

Data storage device 744 may store one or more programs 746, one or more computer readable program instructions 748, and/or data (including, but not limited to, stored tables 606), etc. The computer readable program instructions may be configured to carry out functions of embodiments of aspects of the invention.

Computer system 702 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode, device drivers, redundant processing units, external disk drive arrays, RAID systems, tape drives, and data archival storage systems, etc.

Computer system 702 may be operational with numerous other general purpose or special purpose computing system environments or configurations. Examples of well-known computing systems, environments, and/or configurations that may be suitable for use with computer system 702 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one particular example, the logic of one or more aspects of the present invention (e.g., activation monitoring 604 and/or repositioning logic 608-referred to herein as a system processing engine) can be embedded in the operating system for smartphones and all the checks can be performed by the microcode at low hardware level, allowing fast processing without delaying the screen interface. Many possibilities exist.

As described above, a capability is provided to improve and/or optimize usage of a touch screen. In one embodiment, the repositioning may be an option automatically enabled by an application or by usage threshold. For instance, it may be enabled if the average statistics are above a certain threshold or if a variation of the values is large, meaning that there are areas with peeks in use or non-use. Other variations exist.

In one example, the position of the display (which may be a restricted area in which a password or other input data is entered) would randomly vary along the screen, at each unlock action or at other selected times. Further, the display may be randomly rotated or its size may be randomly changed. Other options are also possible.

One or more aspects relate to optimizing the wear surface of a touch screen of a device due to activations by the user of the device when an application executing on the device uses it. In one example, applications executing on the device display contact points on the screen to be activated by the user. The coordinates of the contact point activations on the touch screen by the user, as requested by the applications executing on the device, are monitored, and counts of contact point activations made by the user on the touch screen are stored in a statistics database. At any time, the average of contact point activations along a specific row of the touch screen surface may be evaluated. In one example, when a threshold of contact point activations is passed, the contact points to be activated on the touch screen are repositioned differently, e.g., by the application or the driver of the display, in order to avoid the touches for which the threshold has been passed.

One or more aspects of the present invention may be extended to other applications/functions, different from the unlocking, and may be selectable by the end-user.

In order to avoid changes in all the applications, the driver of the display can be enhanced so that it may remap areas differently on the screen by using a different set of coordinates.

Many variations are possible without departing from a spirit of aspects of the present invention. It should be noted that various aspects and features are described herein, and unless otherwise inconsistent, each aspect or feature may be combinable with any other aspect or feature.

One or more aspects of the present invention are inextricably tied to computer technology and/or a technical field of touch screen devices, improving performance thereof. Further details of one embodiment of improving processing of a touch screen device, as it relates to one or more aspects of the present invention, are described with reference to FIGS. 8A-8B.

Referring to FIG. 8A, in one embodiment, based on using a touch screen of a device, usage information of the touch screen is obtained (800). The touch screen includes a plurality of contact points (802). Based on the usage information, a determination is made of positioning information for a display to be depicted on the touch screen (804). The display is to be used to enter data and includes multiple contact points of the plurality of contact points (806). Based on the positioning information, the display is repositioned on the touch screen (808). The repositioning includes moving one or more contact points of the multiple contact points from one or more locations on the touch screen to one or more other locations on the touch screen (810).

In a further embodiment, the display is altered (812). For example, a size of the display is changed (814). As another example, an orientation of the display is changed (816). A user is provided an indication of the orientation of the display (818).

Figure 8B:
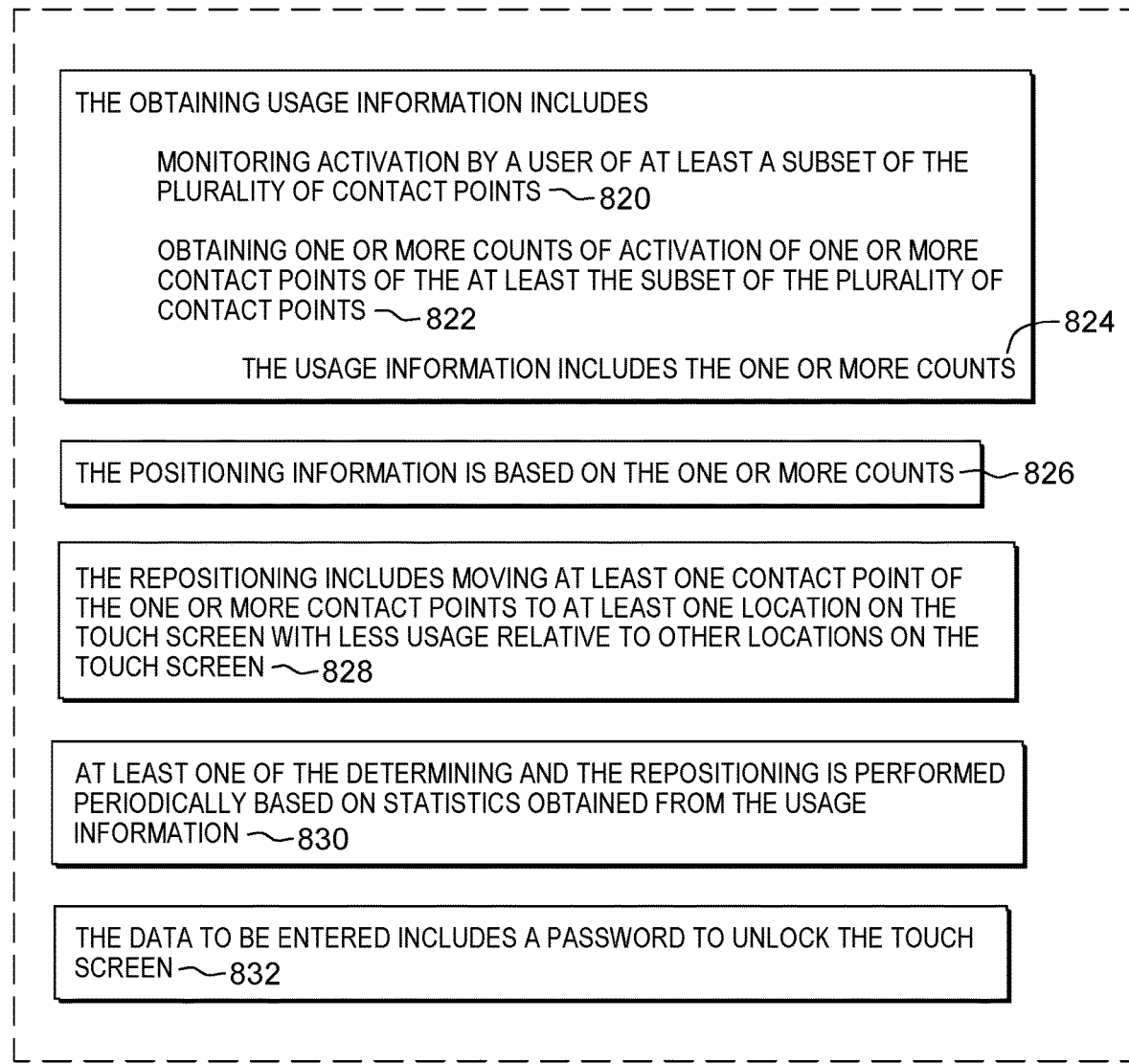

Further, referring to FIG. 8B, as an example, the obtaining usage information includes monitoring activation by a user of at least a subset of the plurality of contact points (820), and obtaining one or more counts of activation of one or more contact points of the at least the subset of the plurality of contact points (822). The usage information includes, for instance, the one or more counts (824), and the positioning information is based, e.g., on the one or more counts (826).

In one example, the repositioning includes moving at least one contact point of the one or more contact points to a location on the touch screen with less usage relative to other locations on the touch screen (828).

Moreover, as examples, at least one of the determining and the repositioning is performed periodically based on statistics obtained from the usage information (830), and/or the data to be entered includes a password to unlock the touch screen (832). Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
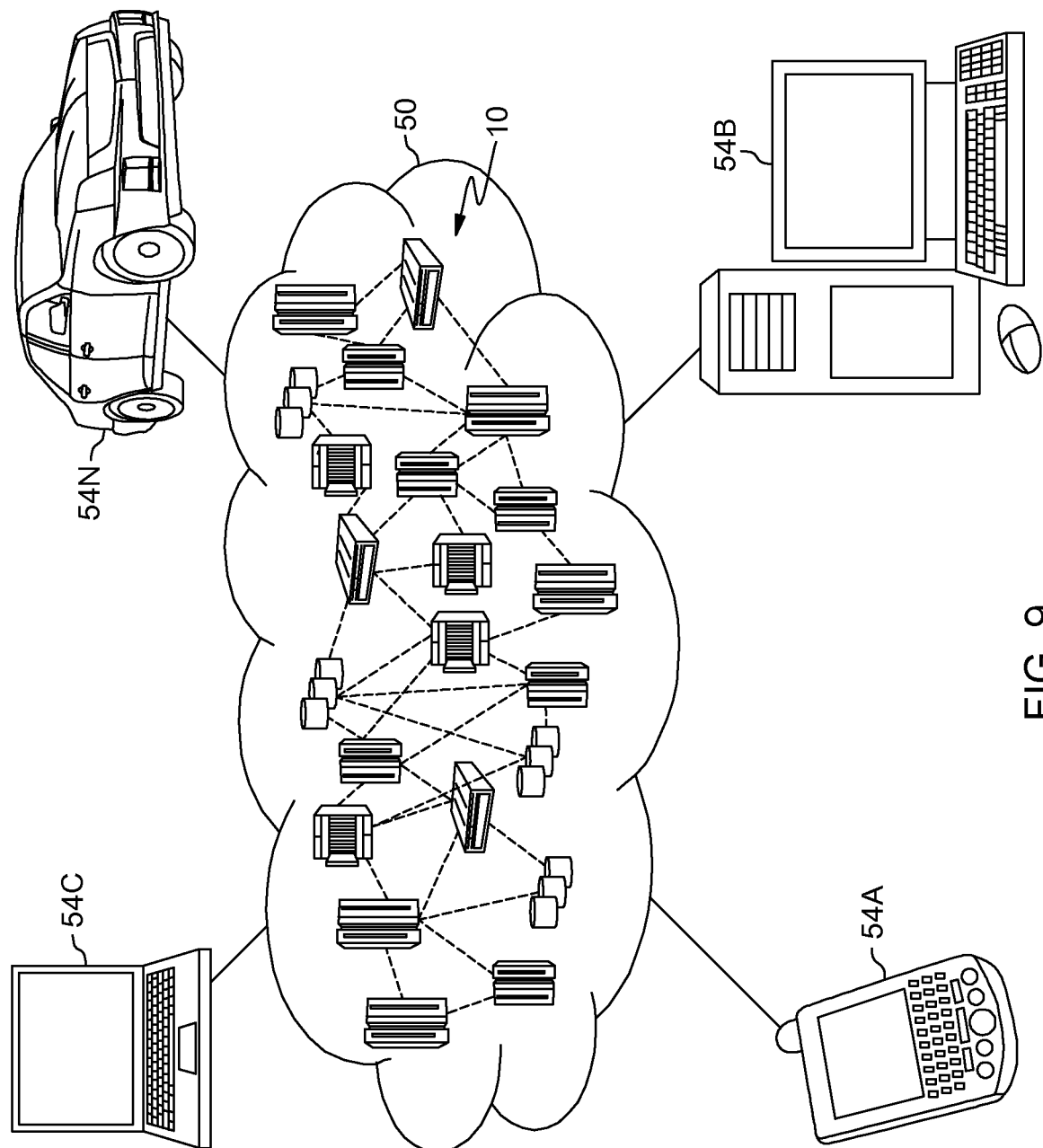
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
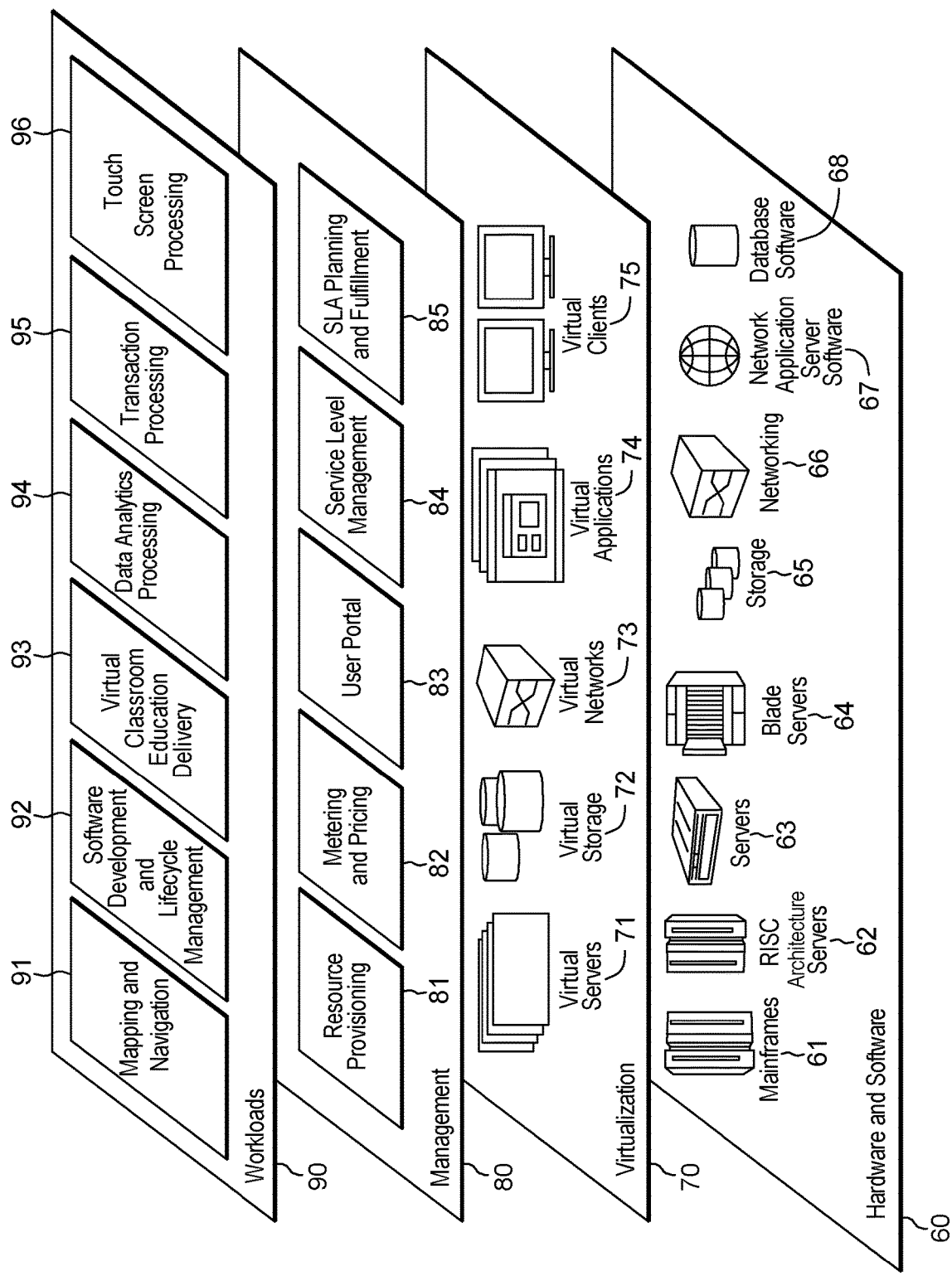
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and touch screen processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of touch screens may be used, and/or other techniques to determine when and/or how to position a display may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating usage of a touch screen of a device, said computer program product comprising:
    a computer readable storage medium readable by a processing circuit and storing instructions for performing a method comprising:
        obtaining, based on the touch screen of the device being used, usage information that includes a separate usage count for each pixel of a plurality of pixels of the touch screen contacted during use of the touch screen, the touch screen comprising a display having an initial configuration pattern of a plurality of contact points to be selected in a defined sequence to enter a password that unlocks the device, each contact point of the plurality of contact points encompassing multiple pixels of the plurality of pixels, wherein contacting a contact point of the display of the plurality of contact points increases a respective usage count for each contacted pixel;
        determining, based on the password being entered, that positioning of the plurality of contact points is to be changed;
        based on obtaining the usage information and determining that positioning of the plurality of contact points is to be changed, using the usage information to generate a modified configuration pattern for the display of the plurality of contact points to be depicted on the touch screen, the using including identifying, from the respective usage count, pixels of the plurality of pixels that have a lowest usage count over a specific time period and based thereon, including the pixels having the lowest usage count in the modified configuration pattern, the modified configuration pattern comprising a change of screen coordinates of at least one contact point of the plurality of contact points of the initial configuration pattern relative to other screen coordinates of at least one other contact point of the plurality of contact points of the initial configuration pattern, the modified configuration pattern being generated to achieve a more uniform touch screen usage across a surface of the touch screen, the changed position of the at least one contact point of the modified configuration pattern of the display encompassing the pixels of the plurality of pixels that have the lowest usage count; and repositioning, based on generating the modified configuration pattern for the display, the at least one contact point to provide the modified configuration pattern for the display on the touch screen, wherein the repositioning comprises moving the at least one contact point relative to the at least one other contact point, the at least one contact point being moved from the current location on the touch screen to another location on the touch screen that includes the pixels having the lowest usage count.

2. The computer program product of claim 1, wherein the modified configuration pattern includes a modified size of the display.

3. The computer program product of claim 1, wherein the change of the screen coordinates of the at least one contact point of the plurality of contact points of the initial configuration pattern relative to the other screen coordinates of the at least one other contact point of the plurality of contact points of the initial configuration pattern includes a rotated orientation of the at least one contact point relative to the at least one other contact point of the display.

4. The computer program product of claim 3, wherein the method further comprises providing a user an indication of the rotated orientation.

5. The computer program product of claim 1, wherein the determining that positioning of the plurality of contact points is to be changed is performed periodically based on statistics obtained from the usage information.

6. A computer system for facilitating usage of a touch screen of a device, said computer system comprising:
   a memory; and
   a processor in communication with the memory, wherein the computer system is configured to perform a method, said method comprising:
      obtaining, based on the touch screen of the device being used, usage information that includes a separate usage count for each pixel of a plurality of pixels of the touch screen contacted during use of the touch screen, the touch screen comprising a display having an initial configuration pattern of a plurality of contact points to be selected in a defined sequence to enter a password that unlocks the device, each contact point of the plurality of contact points encompassing multiple pixels of the plurality of pixels, wherein contacting a contact point of the display of the plurality of contact points increases a respective usage count for each contacted pixel;
      determining, based on the password being entered, that positioning of the plurality of contact points is to be changed;
      based on obtaining the usage information and determining that positioning of the plurality of contact points is to be changed, using the usage information to generate a modified configuration pattern for the display of the plurality of contact points to be depicted on the touch screen, the using including identifying, from the respective usage count, pixels of the plurality of pixels that have a lowest usage count over a specific time period and based thereon, including the pixels having the lowest usage count in the modified configuration pattern, the modified configuration pattern comprising a change of screen coordinates of at least one contact point of the plurality of contact points of the initial configuration pattern relative to other screen coordinates of at least one other contact point of the plurality of contact points of the initial configuration pattern, the modified configuration pattern being generated to achieve a more uniform touch screen usage across a surface of the touch screen, the changed position of the at least one contact point of the modified configuration pattern of the display encompassing the pixels of the plurality of pixels that have the lowest usage count; and repositioning, based on generating the modified configuration pattern for the display, the at least one contact point to provide the modified configuration pattern for the display on the touch screen, wherein the repositioning comprises moving the at least one contact point relative to the at least one other contact point, the at least one contact point being moved from the current location on the touch screen to another location on the touch screen that includes the pixels having the lowest usage count.

7. The computer system of claim 6, wherein the modified configuration pattern includes a modified size of the display.

8. The computer system of claim 6, wherein the change of the screen coordinates of the at least one contact point of the plurality of contact points of the initial configuration pattern relative to the other screen coordinates of the at least one other contact point of the plurality of contact points of the initial configuration pattern includes a rotated orientation of the at least one contact point relative to the at least one other contact point of the display.

9. A computer-implemented method of facilitating usage of a touch screen of a device, said computer-implemented method comprising:
   obtaining, based on the touch screen of the device being used, usage information that includes a separate usage count for each pixel of a plurality of pixels of the touch screen contacted during use of the touch screen, the touch screen comprising a display having an initial configuration pattern of a plurality of contact points to be selected in a defined sequence to enter a password that unlocks the device, each contact point of the plurality of contact points encompassing multiple pixels of the plurality of pixels, wherein contacting a contact point of the display of the plurality of contact points increases a respective usage count for each contacted pixel;
   determining, based on the password being entered, that positioning of the plurality of contact points is to be changed;
   based on obtaining the usage information and determining that positioning of the plurality of contact points is to be changed, using the usage information to generate a modified configuration pattern for the display of the plurality of contact points to be depicted on the touch screen, the using including identifying, from the respective usage count, pixels of the plurality of pixels that have a lowest usage count over a specific time period and based thereon, including the pixels having the lowest usage count in the modified configuration pattern, the modified configuration pattern comprising a change of screen coordinates of at least one contact point of the plurality of contact points of the initial configuration pattern relative to other screen coordinates of at least one other contact point of the plurality of contact points of the initial configuration pattern, the modified configuration pattern being generated to achieve a more uniform touch screen usage across a surface of the touch screen, the changed position of the at least one contact point of the modified configuration pattern of the display encompassing the pixels of the plurality of pixels that have the lowest usage count; and repositioning, based on generating the modified configuration pattern for the display, the at least one contact point to provide the modified configuration pattern for the display on the touch screen, wherein the repositioning comprises moving the at least one contact point relative to the at least one other contact point, the at least one contact point being moved from the current location on the touch screen to another location on the touch screen that includes the pixels having the lowest usage count.

10. The computer-implemented method of claim 9, wherein the modified configuration pattern includes a modified size of the display.

11. The computer-implemented method of claim 9, wherein the change of the screen coordinates of the at least one contact point of the plurality of contact points of the initial configuration pattern relative to the other screen coordinates of the at least one other contact point of the plurality of contact points of the initial configuration pattern includes a rotated orientation of the at least one contact point relative to the at least one other contact point of the display.

12. The computer program product of claim 1, wherein the modified configuration pattern includes a misalignment of the at least one contact point of the plurality of contact points such that the at least one contact point of the plurality of contact points is positioned farther away from the at least one other contact point relative positioning of the at least one contact point and the at least one other contact point of the initial configuration pattern.

13. The computer program product of claim 1, wherein determining, based on the password being entered, that positioning of the plurality of contact points is to be changed further comprises determining a usage count percentage variation of the separate usage count for each pixel of the plurality of pixels.

14. The computer program product of claim 1, wherein using the usage information to generate a modified configuration pattern for the display of the plurality of contact points to be depicted on the touch screen is based on set-up options that include a selected orientation, specified by a user, for the display.

15. The computer program product of claim 14, wherein the set-up options further include a selected size, specified by the user, for the display.

* * * * *